United States Patent [19]

Stixrud

[11] Patent Number: 5,253,938
[45] Date of Patent: Oct. 19, 1993

[54] THERMISTOR CONTROLLED CURRENT SOURCE VERSATILE TEMPERATURE SENSOR

[75] Inventor: Thomas E. Stixrud, San Diego, Calif.

[73] Assignee: The United States of America as represented by the Secretary of the Navy, Washington, D.C.

[21] Appl. No.: 957,563

[22] Filed: Oct. 7, 1992

[51] Int. Cl.$^5$ .................. G01K 7/24; G01K 33/06
[52] U.S. Cl. ..................... 374/173; 307/310; 323/294; 374/208
[58] Field of Search ............ 374/183, 178, 110, 101, 374/173; 307/310; 323/293, 294

[56] References Cited

U.S. PATENT DOCUMENTS

| | | | |
|---|---|---|---|
| 3,106,645 | 10/1963 | Kaufman | 374/178 X |
| 3,530,718 | 10/1967 | Ehlo . | |
| 3,731,535 | 5/1973 | Wendt, Jr. . | |
| 3,817,104 | 6/1974 | Sapir | 374/173 |
| 3,934,476 | 1/1976 | Lamb, II . | |
| 3,973,147 | 8/1976 | Yu | 307/310 |
| 4,004,462 | 1/1977 | Dobkin | 374/173 |
| 4,210,024 | 7/1980 | Ishiwatari et al. . | |
| 4,593,241 | 6/1986 | Eulenberg et al. | 374/294 |
| 4,755,958 | 7/1988 | Mizuhara . | |
| 5,073,034 | 12/1991 | Beran et al. . | |

OTHER PUBLICATIONS

"National Semiconductor", Industrial/Automotive/-Functional Blocks/Telecommunications, (pp. 9-13, 9-14, 9-15, 9-16, 9-17, 9-18, 9-19 and 9-20), (LM 334).

*Primary Examiner*—Daniel M. Yasich
*Attorney, Agent, or Firm*—Harvey Fendelman; Thomas Glenn Keough

[57] ABSTRACT

An uncomplicated and reliable temperature sensor has a pair thermistors coupled in parallel with a current source that is connected in series with a load resistor. Temperature variations cause a robust current output change that generates a corresponding robust output voltage determined by a proper selection of the load resistor. Increased sensitivity is provided by the robust current to avoid many of the problems otherwise associated with D.C. amplifiers (e.g., drift).

12 Claims, 1 Drawing Sheet

THERMISTOR CONTROLLED CURRENT SOURCE VERSATILE TEMPERATURE SENSOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Temperature or velocity measurements routinely are taken to provide data for responsive action. Although a wide variety of sensors have evolved, a particular type of sensor that has found widespread application is the thermistor. A thermistor is a special resistor that varies in resistance with temperature. Electric current is passed through a thermistor to generate a voltage across the thermistor. This voltage can be measured and calibrated to represent temperature. However, the current through any resistor also produces heat and this heat raises the temperature of the thermistor to cause an error in temperature measurement.

When thermistors are used to measure temperature profiles in the sea, for example, a thermistor is moved slowly up and down through the water from a floating platform or a chain of thermistors are suspended from the platform. In temperature sensing applications the electrical current through the thermistors must be low to minimize self heating errors.

Limitations to these applications of thermistors arise since the resolution of the temperature measurement is limited by the accuracy with which the voltage generated across the thermistor by the low current can be measured. Another limitation on the accuracy is that the signal processing equipment is located in a different environment than the thermistor so that the consequent temperature variations in the equipment produce errors that obscure small variations from the thermistor. A third limitation on the accuracy is the errors attributed to the different resistances of the different lengths of wire connecting the thermistors in a chain to the remote signal processing equipment. A fourth limitation on the accuracy is the negative characteristic of resistance of the thermistors with temperature which reduces resolution at higher temperatures.(A positive characteristic of resistance of the thermistor with temperature would reduce the accuracy at lower temperatures). The difference in resolution is caused by the exponential change in resistance of the thermistor with temperature.

Thus, there is a continuing need in the state of the art for an apparatus and method to improve and simplify the measurement of temperature by using thermistors to control the current output of electrical current sources.

SUMMARY OF THE INVENTION

The present invention is directed to providing a method and apparatus for providing an uncomplicated and reliable measurement of temperature by using thermistors to control the current output of electrical current sources. A pair of thermistors are coupled in parallel to control a current source which is connected in series with a load resistor. Temperature variations cause a robust voltage output change in a range determined by a proper selection of the load resistor. The robust current provides for increased sensitivity to avoid many of the problems otherwise associated with D.C. amplifiers (e.g., drift).

An object of the invention is to provide an improved method and apparatus for measuring temperature.

Another object is to provide an improved method and apparatus for measuring temperature that is uncomplicated and reliable.

Still another object is to provide an improved apparatus and method for measuring temperature using a pair of thermistors coupled in parallel to control a current source that is connected in series with a load resistor to produce robust voltage output changes caused by temperature variations.

Another object is to improve and simplify the measurement of temperature by using selected pairs of parallel thermistors to control the current output of electrical current sources and produce interchangeable temperature sensors.

Another object is to provide for an improved temperature sensor with less self heating error since part of the output current does not go through a thermistor.

Another object is to provide for an improved temperature sensor with a choice of output voltages and dynamic ranges by proper selection of a load resistor.

Another object is to provide for an improved temperature sensor having both the relatively small current source and the load resistor assembled with the thermistor in the same temperature environment to assure that all component variations with temperature are included in a calibration.

Another object is to provide for an improved temperature sensor having the signal voltage to be generated at the sensor package suffer no appreciable loss due to cable length.

Another object is to provide for an improved temperature sensor having thermistors with a negative characteristic of resistance with temperature in combination with a current source with a positive characteristic of current with temperature to produce more sensitivity at higher temperatures.

These and other objects of the invention will become more readily apparent from the ensuing specification and drawings when taken in conjunction with the appended claims.

DESCRIPTION OF THE PREFERRED EMBODIMENT

An uncomplicated and reliable measurement of temperature uses a novel arrangement of off-the-shelf components to provide a selectable robust current output with increased sensitivity to avoid many of the problems otherwise associated with D.C. amplifiers, such as, drift.

Figure 3:
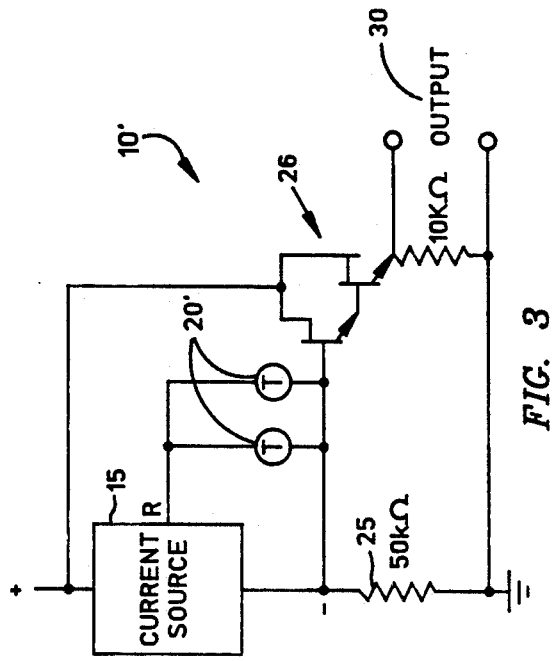
FIG. 3 is a schematic representation of one embodiment employing two parallel thermistors in accordance with this inventive concept.
Figure 2:
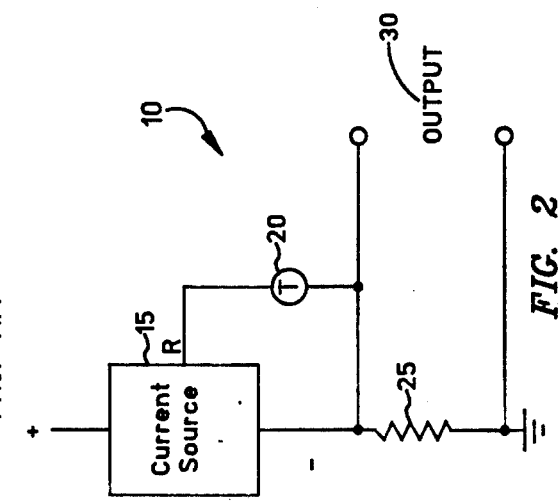
FIG. 2 is a schematic representation of one embodiment employing a single thermistor in accordance with this inventive concept.

Referring to FIGS. 2 and 3, a feature of this inventive concept is to make a better temperature sensor 10 and 10', by combining a current source 15 with at least one thermistor 20 or 20', than would be provided by either one alone. A temperature sensor fabricated in accordance with this inventive concept is waterproofed by thin coats of epoxy in a technique well known in the art to assure the fast reaction time needed to detect small and rapid changes in temperature. Components to be described can be matched so that groups of temperature sensors will have the same resistance at the same temperature and be interchangeable as apparent to those skilled in the art to which this invention pertains.

Figure 1:
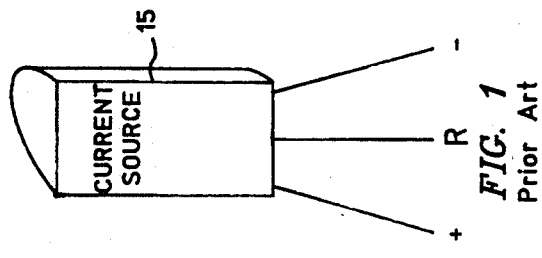
FIG. 1 is a schematic depiction of a typical current source package.

Referring now to FIG. 1 of the drawings, a commercially available modern current source 15 is packaged to look much like a small plastic transistor. It has three leads that are labeled "+", "−" and "R" to assure that the proper connections are made. The "+" and "−" are for bias connections and, when a fixed resistor is connected between the "−" and "R" leads, a control is provided for a robust output current. The output current from an LM 334 current source for example, is termed robust since it can have a magnitude of between one microamp to 10 milliamps. In other words, when the robust output current has a magnitude of between one microamp and 10 milliamps which is fed through a load resistor 25 having a magnitude of 50 K$\Omega$, for example, the output voltage may vary from 1 millivolt to 500 volts, a very robust output voltage change. For reasons to be set out below, the robust current most likely will be within a robust current range which is within a portion of the range from one microamp to 10 milliamps. This robust current signal is seen to be markedly more stable and reliable for the production of a robust output voltage than the signals routinely provided by a typical conventional temperature sensor arrangement that has a 0.1 output voltage range for the temperature range 20° to 35°. It is clear that the robust voltage signal produced in accordance with this inventive concept that has an extended range is superior since it avoids the limitations set forth above.

A typical example of a commercially available current source that may be used in accordance with this inventive concept is an LM-334 marketed by National Semiconductor Corporation of 2900 Semiconductor Drive, Santa Clara, Ca. 95052. A number of other suitable current sources could be selected as appropriate as will be apparent to one having ordinary skill in the art.

In the first embodiment shown in FIG. 2, temperature sensor 10 has a thermistor 20 connected in place of the fixed resistor across the "−" and "R" leads of current source 15. This configuration, along with an interconnected load resistor 25 provides the capability to vary the output current at an output 30 as a function of varying temperature. Typically, the thermistors could be the Series S/P 100 produced by Thermometrics Incorporated, 808 US Hiway 1, Edison, N.J. 00817. Other thermistors may be chosen by a routineer in accordance with this inventive concept.

FIG. 3 shows another embodiment in which temperature sensor 10' was assembled from an LM-334 current source 15, two 2" glass thermistor probes 20 in parallel, a 50 K ohm load resistor 25, and a low output impedance 26 made up of two appropriately interconnected Darlington transistors with a 10 K$\Omega$ resistor. The transistors served to provide a low output impedance and to drop an output voltage about 1.2 volts. Pairing the selected thermistors in series or parallel was found to be a way of producing interchangeable temperature characteristics. A parallel interconnection was chosen to also lower the control current, reducing self heating. With this arrangement the output 30 varies from 1.5 volts at 20 degrees C and 4 volts at 35 degrees C.

The 50 kilohm load resistor 25 provided a predetermined dynamic range of 2.5 volts with a temperature change from 20° C. to 35° C. This 2.5 volt change is a robust output voltage charge particularly when compared to one tenth of one volt changes that are typical with conventional sensor arrangements. Since a particular processing application required an output below 5 volts, the Darlington pair of transistors and 10 K$\Omega$ resistor (see FIG. 3) were added for the base emitter voltage drops of 0.6 volts each.

In this configuration the current source varied to provide a robust current from 50 microamps to 100 microamps. At the same time with a constant bias of 62 milivolts at leads "+" and "−" the current source provided a current of 15 microamps to 30 microamps through the thermistors. This configuration reduced the self heating of the thermistors about 1000% and gave a 28 dB increase in the dynamic range available from the thermistors alone, with 50 to 100 microamps of current generating the robust output signal voltage.

Figure 4:
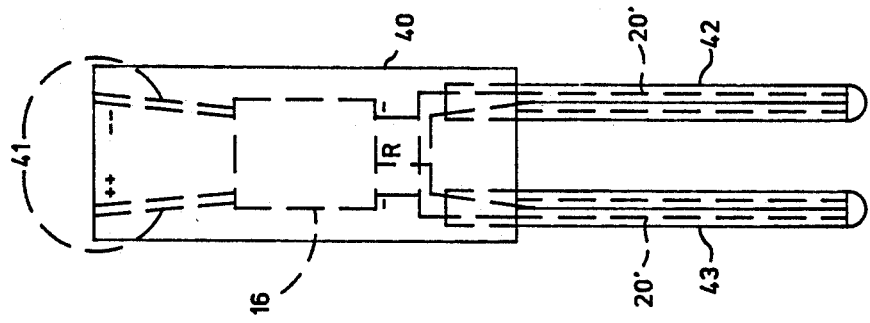
FIG. 4 schematically shows a housing for the current source, two parallel thermistors and the associated circuitry with an appropriate communication with the ambient to permit a responsive temperature sensing. An optional location for probe to thermistors also are depicted in accordance with this inventive concept.

Referring to FIG. 4, either of the embodiments or obvious variations are simple yet reliable and, with a suitable interconnected biasing source the associated interconnected circuitry 16 (elements 15, 20 or 20', 25, 26, 30) could be placed in a housing 40, such as an epoxy resin filled plastic tube. This packaging could lend itself to prolonged unattended periods of operation, Optionally, the temperature sensors could have biasing leads ++ and extending to remote biasing power sources and/or could be interconnected in long chains of sensors. The housing also could be a potting structure containing a temperature sensor 10 or 10' having circuitry 16 that has an appropriate opening or passageway 41 to the ambient so as to permit a responsive temperature sensing thereof. A variation of this potted configuration might have tubes 42 and 43 containing glass probe thermistors 20' connected to the other elements of circuitry 16, such as shown in FIG. 3.

A temperature sensor fabricated in accordance with this inventive concept inherently has less self heating error since part of the output current does not go through thermistor, or thermistors 20 or 20'. All of the output current is coupled across the load resistor 25 to produce a robust output voltage. A temperature sensor in accordance with this inventive concept inherently has a choice of the range of robust output voltages and dynamic ranges since load resistor 25 can be selected to provide range limits for the job at hand or to accommodate the interconnected, monitoring components. A temperature sensor fabricated in accordance with this inventive concept provides for convenience in packaging. Since both current source 15 and load resistor 25 are small enough to be assembled with thermistor or thermistors 20 and 20' that they are all located in the same temperature environment. As a consequence all component variations with temperature are included in the calibration. A temperature sensor fabricated in accordance with this inventive concept assures that the robust signal voltage at output 30 is generated at the sensor package. This arrangement suffers no appreciable loss as compared to the losses caused by a sensed signal's having to travel a long wire to a high impedance input recorder which is typically used with this type of sensor. A temperature sensor fabricated in accordance with this inventive concept produces more sensitivity at higher temperatures because thermistors 20 and 20' with a negative characteristic of resistance with temperature, when used in combination a typical current source 15, an LM-334 for example, produces more current as the control resistance decreases which results in a positive overall characteristic of voltage output with increasing temperature.

A temperature sensor fabricated in accordance with this inventive concept combines thermistors 20' with an LM-334 current source 15 to make a better temperature sensor than either one alone. (The LM-334 is included with and is sold as a temperature sensor by National Semiconductor Corporation under the designation LM-335. The LM-335 is different than this inventive concept since it is effected by and it depends on the small temperature effect inherent in the LM-334.) The use of bare LM-334 chips controlled by miniature bead thermistors and waterproofed by thin coats of epoxy can provide the fast reaction time needed to detect small and rapid changes in temperature. Components are matchable so that groups of temperature sensors will have the same resistance at the same temperature and be interchangeable.

Obviously, many modifications and variations of the present invention are possible in the light of the above teachings. It is therefore to be understood that within the scope of the appended claims the invention may be practiced otherwise than as specifically described.

I claim:

1. An apparatus for providing an uncomplicated and reliable measurement of temperature comprising:
   a current source provided with "+" and "−" biasing leads and an "R" load resistor lead, said current source having the capability for providing a robust current within a robust current range being at least a portion of the range from one microamp to 10 milliamps;
   a pair of thermistors coupled in parallel with respect to one another to lower a control current and consequent self heating, said pair of thermistors being coupled to the "−" lead and the "R" lead of said current source and having the property to vary in resistance in accordance with said temperature; and
   a load resistor connected in series to said "−" lead of said current source to receive said robust current to provide an output being a function of temperature variations to cause a robust output voltage change thereacross in a range determined by the magnitude of said load resistor.

2. An apparatus according to claim 1 further including:
   a low output impedance device connected to said pair of thermistors and said load resistor.

3. A method of providing an uncomplicated and reliable measurement of temperature comprising:
   providing a current source provided with "+" and "−" biasing leads and an "R" load resistor lead, said current source having the capability for producing a robust current within a robust current range being at least a portion of the range from one microamp to 10 milliamps;
   coupling at least one thermistor to the "−" lead and "R" lead of said current source;
   varying the resistance of said at least one thermistor with temperature variations;
   connecting a load resistor in series to said "−" lead;
   connecting a low output impedance device to said at least one thermistor and said load resistor;
   providing an output being a function of temperature variations to cause an output change in said robust voltage in a range determined by a proper selection of the magnitude of said load resistor; and
   providing a housing for said current source, at said least one thermistor and said load resistor, said housing having an opening to the ambient to permit said measurement of temperature sensing thereof.

4. A method of providing an uncomplicated and reliable measurement of temperature comprising:
   providing a current source provided with "+" and "−" biasing leads and an "R" load resistor lead, said current source having the capability for producing a robust current within a robust current range being at least a portion of the range from one microamp to 10 milliamps;
   coupling at least one thermistor to the "−" lead and "R" lead of said current source;
   varying the resistance of said at least one thermistor with temperature variations;
   connecting a load resistor in series to said "−" lead;
   connecting a low output impedance device to said at least one thermistor and said load resistor;
   providing an output being a function of temperature variations to cause an output change in said robust voltage in a range determined by a proper selection of the magnitude of said load resistor; and
   providing a housing for said current source, at said least one thermistor and said load resistor, said housing having an opening to the ambient to permit said measurement of temperature sensing thereof.

5. A method of providing an uncomplicated and reliable measurement of temperature comprising:
   providing a current source provided with "+" and "−" biasing leads and an "R" load resistor lead, said current source having the capability for producing a robust current within a robust current range being at least a portion of the range from one microamp to 10 milliamps;
   coupling at least one thermistor to the "−" lead and "R" lead of said current source;
   varying the resistance of said at least one thermistor with temperature variations;
   connecting a load resistor in series to said "−" lead; and
   providing an output being a function of temperature variations to cause an output change in said robust voltage in a range determined by a proper selection of the magnitude of said load resistor, in which said coupling at least one thermistor to said "−" and said "R" leads of said current source is the coupling of a pair of parallel thermistors; and
   providing a housing for said current source, at said least one thermistor and said load resistor, said housing having an opening to the ambient to permit said measurement of temperature sensing thereof.

6. A method of providing an uncomplicated and reliable measurement of temperature comprising:
   providing a current source provided with "+" and "−" biasing leads and an "R" load resistor lead, said current source having the capability for producing a robust current within a robust current range being at least a portion of the range from one microamp to 10 milliamps;

coupling at least one thermistor to the "—" lead and "R" lead of said current source;

varying the resistance of said at least one thermistor with temperature variations;

connecting a load resistor in series to said "—" lead; and providing an output being a function of temperature variations to cause an output change in said robust voltage in a range determined by a proper selection of the magnitude of said load resistor, in which said coupling at least one thermistor to said "—" and said "R" leads of said current source is the coupling of a single thermistor; and providing a housing for said current source, at said least one thermistor and said load resistor, said housing having an opening to the ambient to permit said measurement of temperature sensing thereof.

7. An apparatus for providing an uncomplicated and reliable measurement of temperature comprising:

a current source provided with "+" and "—" biasing leads and an "R" load resistor lead, said current source having the capability for producing a robust current within a robust current range being at least a portion of the range from one microamp to 10 milliamps;

at least one thermistor coupled to the "—" lead and the "R" lead of said current source having the property to vary in resistance in accordance with said temperature;

a load resistor connected in series to said "—" lead of said current source to provide an output being a function of temperature variations to cause a robust output voltage change thereacross in a range determined by the magnitude of said load resistor; and a housing sized to contain said current source, said at least one thermistor and said load resistor, said housing provided with an appropriate opening to the ambient to permit said measurement of temperature.

8. An apparatus for providing an uncomplicated and reliable measurement of temperature comprising:

a current source provided with "+" and "—" biasing leads and an "R" load resistor lead, said current source having the capability for producing a robust current within a robust current range being at least a portion of the range from one microamp to 10 milliamps;

at least one thermistor coupled to the "—" lead and the "R" lead of said current source having the property to vary in resistance in accordance with said temperature;

a load resistor connected in series to said "—" lead of said current source to provide an output being a function of temperature variations to cause a robust output voltage change thereacross in a range determined by the magnitude of said load resistor;

a low output impedance device connected to said at least one thermistor and said load resistor; and a housing sized to contain said current source, said at least one thermistor and said load resistor, said housing provided with an appropriate opening to the ambient to permit said measurement of temperature.

9. An apparatus for providing an uncomplicated and reliable measurement of temperature comprising:

a current source provided with "+" and "—" biasing leads and an "R" load resistor lead, said current source having the capability for producing a robust current within a robust current range being at least a portion of the range from one microamp to 10 milliamps;

at least one thermistor coupled to the "—" lead and the "R" lead of said current source having the property to vary in resistance in accordance with said temperature, said at least one thermistor is a pair of thermistors coupled in parallel;

a load resistor connected in series to said "—" lead of said current source to provide an output being a function of temperature variations to cause a robust output voltage change thereacross in a range determined by the magnitude of said load resistor; and a housing sized to contain said current source, said at least one thermistor and said load resistor, said housing provided with an appropriate opening to the ambient to permit said measurement of temperature.

10. An apparatus for providing an uncomplicated and reliable measurement of temperature comprising:

a current source provided with "+" and "—" biasing leads and an "R" load resistor lead, said current source having the capability for producing a robust current within a robust current range being at least a portion of the range from one microamp to 10 milliamps;

at least one thermistor coupled to the "—" lead and the "R" lead of said current source having the property to vary in resistance in accordance with said temperature, said at least one thermistor is a pair of thermistors coupled in parallel;

a load resistor connected in series to said "—" lead of said current source to provide an output being a function of temperature variations to cause a robust output voltage change thereacross in a range determined by the magnitude of said load resistor; and a low output impedance device connected to said at least one thermistor and said load resistor; and a housing sized to contain said current source, said at least one thermistor and said load resistor, said housing provided with an appropriate opening to the ambient to permit said measurement of temperature sensing.

11. A method of providing an uncomplicated and reliable measurement of temperature comprising:

providing a current source provided with "+" and "—" biasing leads and an "R" load resistor lead, said current source having the capability for producing a robust current within a robust current range being at least a portion of the range from one microamp to 10 milliamps;

coupling a pair of thermistors coupled in parallel with respect to one another to lower a control current and consequent self heating, to the "—" lead and "R" lead of said current source;

varying the resistance of said pair of thermistors with temperature variations;

connecting a load resistor in series to said "—" lead to receive said robust current; and providing an output being a function of temperature variations to cause a robust voltage change in a range determined by a proper selection of the magnitude of said load resistor.

12. A method according to claim 11 further including:

connecting a low output impedance device to said pair of thermistors and said load resistor.

* * * * *